United States Patent
Kim et al.

(10) Patent No.: US 7,342,853 B2
(45) Date of Patent: Mar. 11, 2008

(54) OPTICAL DISC SYSTEM AND METHOD FOR MANAGING SHOCK DURING DATA RECORD/PLAY

(75) Inventors: Soo-yong Kim, Seoul (KR); Bo-min Hwang, Suwon (KR); Young-hoon Lee, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 11/616,172

(22) Filed: Dec. 26, 2006

(65) Prior Publication Data

US 2007/0104049 A1 May 10, 2007

Related U.S. Application Data

(63) Continuation of application No. 10/461,026, filed on Jun. 13, 2003, now Pat. No. 7,177,248.

(30) Foreign Application Priority Data

Oct. 14, 2005 (KR) .................. 02-62573

(51) Int. Cl.
*G11B 7/00* (2006.01)
*G11B 5/09* (2006.01)

(52) U.S. Cl. .............. 369/44.32; 369/53.18; 369/4.11

(58) Field of Classification Search ............ None
See application file for complete search history.

(56) References Cited

U.S. PATENT DOCUMENTS

2002/0035575 A1* 3/2002 Taira et al. .............. 369/275.3
2002/0181364 A1* 12/2002 Ikeda et al. .............. 369/47.52

* cited by examiner

*Primary Examiner*—Muhammad Edun
(74) *Attorney, Agent, or Firm*—F. Chau & Assoc. LLC

(57) ABSTRACT

An optical disc system and a method of managing shock while recording or playing data in the optical disc system are provided. The optical disc system includes an optical pick-up unit for applying a laser beam to a track of an optical disc and detecting reflected light, a servo unit for controlling tracking and focus of the optical pick-up unit and a monitoring unit for comparing a monitoring signal, which is output from the optical pick-up unit and the servo unit, with a reference signal and generating a blocking signal and a blocking release signal. Recording or playing of data on the optical disc is stopped in response to the blocking signal, and recording or playing of the data on the optical disc is resumed in response to the blocking release signal based on a state of the optical disc system when recording or playing was stopped.

7 Claims, 4 Drawing Sheets

OPTICAL DISC SYSTEM AND METHOD FOR MANAGING SHOCK DURING DATA RECORD/PLAY

CROSS-REFERENCE TO RELATED APPLICATIONS

This application is a continuation of U.S. patent application Ser. No. 10/461,026, filed Jun. 13, 2003, now U.S. Pat. No. 7,177,248 which claims priority to Korean Patent Application No. 2002-62573, filed 14 Oct. 2002, the disclosures of which are herein incorporated by reference in their entirety.

FIELD OF THE INVENTION

The present invention relates generally to an optical disc system, and more particularly, to a method of managing shock during recording and reproduction in an optical disc system and an apparatus therefor.

DESCRIPTION OF THE RELATED ART

An optical disc system is used to record data on an optical disc, such as a compact disc (CD), a digital video disc, or a digital versatile disc (DVD) and to play the recorded data. The optical disc recording/playing apparatus records data with an optical pick-up device that generates a pit in a track of the optical disc by applying a record laser beam to the track. Spaces between pits in the track are called lands, and the pits and lands represent 0's and 1's, e.g., bits of the recorded data. The optical disc recording/playing apparatus plays data by applying a play laser beam to the track of the optical disc to be played, determining whether the pits exist by searching for a change in the strength of reflected light and playing recorded digital data according to the determination result.

The optical disc system extracts information for tracking the track of the optical disc and focusing on a bit in the track, In general, a focus error signal and a tracking error signal are used as the tracking and the focusing information. This information is used as feedback to the optical disc system to improve the tracking and focusing.

When an internal or external shock interrupts recording or playing of data, a temporary stop in recording or playing of the data before operations resume will protect existing data and preserve the disc.

In the conventional art, Japanese Laid-Open Patent Publication Hei No. 11-120680, discloses changing a recording or playing state of an optical disc system when an external shock is detected. In the 11-120690 Publication, if the strength of the detected external shock exceeds a predetermined level, an operation state of a servo is changed to stop recording or playing of data.

In the conventional art, applicant is not aware of any method of stopping and resuming recording to the optical disc when there exists external shock. In addition, there are limitations to methods of detecting the external shock by a tracking signal output from the optical pick-up.

Accordingly, an optical disc system which is capable of detecting an external shock, temporarily stopping recording or playing of data in response to the detected shock and resuming the recording or playing of data by using information stored when the recording or playing is stopped is needed to enhance the recording or playing of data in the optical disc system.

FIG. 1 shows a waveform of several signals of the optical disc system, including a summing signal of a side beam (SBAD) and a tracking signal (TRS) responding to an external shock. The SBAD, a sum of side beams of a photo diode of the optical pick-up, is used to check a focus state of an optical pick-up unit.

A level of the SBAD is sharply lowered when the external shock is applied, and a level of the TRS is sharply heightened when the shock is applied. That is, the levels are different from those in a normal state. As shown in FIG. 1, the SBAD responds to shock faster than the TRS by 120 ms.

Although the responding speed of the SBAD, i.e., a focus related signal, is faster than the TRS, the TRS is generally used to detect the shock in the conventional optical disc systems. This is because the optical disc system stops recording and does not resume recording when shock is applied.

Therefore, a method for resuming recording, as well as protecting data and the optical disc by stopping recording as soon as possible, when any external shock or disturbance interrupts recording, is desired.

SUMMARY OF THE INVENTION

An optical disc system which is capable of stably recording and playing data by detecting shock applied during the recording and playing, temporarily stopping recording or playing of data, and resuming recording or playing operations when the shock is released is provided.

Additionally, a method of managing shock in the optical disc system is provided.

According to an aspect of the present invention, there is provided an optical disc system comprising a comparator which compares a monitoring signal with a reference signal and generates a comparison signal, and a blocking signal generator which generates a blocking signal when the presence of a shock is determined based on the comparison signal, wherein the optical disc system stops recording or playing data on an optical disc in response to the blocking signal and stores information on the state of the optical disc system when recording or playing is stopped.

Preferably, when the blocking signal is generated, the optical disc system turns off a laser diode or changes a level of an optical power of the laser diode to a level lower than a predetermined level.

According to another aspect of the present invention, there is provided an optical disc system comprising an optical pick-up unit which applies a laser beam to a track of an optical disc and detects reflected light, a servo unit which controls tracking and focus of the optical pick-up unit, a monitoring unit which compares a monitoring signal, which is output from the optical pick-up unit and the servo unit, with a reference signal and generates a blocking signal and a blocking release signal, a microprocessor which outputs an optical power control signal for controlling an optical power of a laser diode of the optical pick-up unit in response to the blocking signal and the blocking release signal, and an optical power controller which changes the optical power of the laser diode in response to the optical power control signal, wherein recording or playing of data on the optical disc is stopped in response to the blocking signal and recording or playing of the data on the optical disc is resumed in response to the blocking release signal.

Preferably, wherein the microprocessor stores information representing the state of the optical disc system in a memory when recording or playing is stopped in response to the blocking signal and loads the information representing the state of the optical disc system from the memory in response to the blocking release signal.

Preferably, the monitoring unit generates the blocking signal when the optical disc system is in a recording mode.

According to still another aspect of the present invention, there is provided a method of managing shock which is applied to an optical disc system, the method comprising (a) setting a monitoring signal of focus signals and setting a level of a reference signal according to the set monitoring signal, (b) determining whether shock is applied by comparing the monitoring signal with the level of the reference signal, (c) generating a blocking signal if it is determined that shock is applied, (d) stopping recording or playing of data on the optical disc in response to the blocking signal and storing information representing a state of the optical disc system when the recording or playing is stopped, (e) determining whether shock is removed by comparing the monitoring signal with the level of the reference signal, (f) loading the stored information on the state of the optical disc system if it is determined that shock is removed, and (g) resuming recording or playing of data on the optical disc by using the loaded information on the state of the optical disc system.

Preferably, the monitoring signal is one of a focus error signal, a summing signal of the side beam (SBAD), a peak hold signal of a recording and playing radio frequency signal, or a bottom hold signal of a recording and playing radio frequency signal.

BRIEF DESCRIPTION OF THE DRAWINGS

The above aspects and advantages of the present invention will become more apparent by describing in detail preferred embodiments thereof with reference to the attached drawings in which.

DETAILED DESCRIPTION OF PREFERRED EMBODIMENTS

The present invention will now be described more fully with reference to the accompanying drawings, in which preferred embodiments of the invention are shown.

Figure 2:
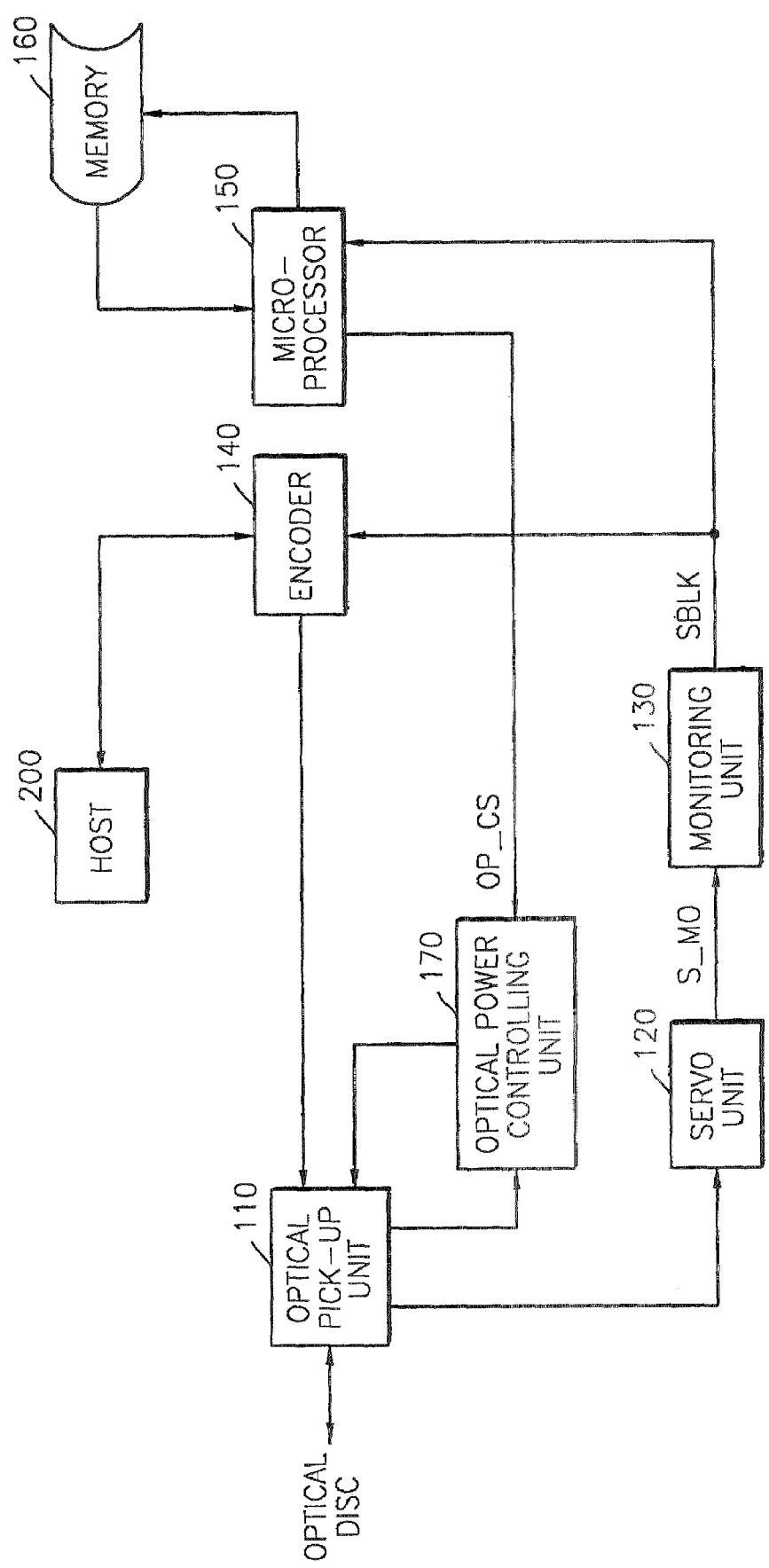
FIG. 2 is a block diagram of an optical disc system according to an embodiment of the present invention.

FIG. 2 is a block diagram of an optical disc system according to an embodiment of the present invention. Referring to FIG. 2, the optical disc system according to an embodiment of the present invention includes an optical pick-up unit 110, a servo unit 120, a monitoring unit 130, an encoder 140, a microprocessor 150, a memory 160, and an optical power-controlling unit 170.

The optical pick-up unit 110 applies a laser beam to a track of an optical disc and detects reflected light. The optical pick-up unit 110 includes a tracking unit for tracking the track of the optical disc and a focus unit for focusing the laser beam on the track of the optical disc, which are not shown in FIG. 2. The servo unit 120 receives a servo signal and a radio frequency (RF) signal from the optical pick-up unit 110. The servo signal includes a tracking signal and a focus signal, and the RF signal includes a playing RF signal and a recording RF signal.

The servo unit 120 controls the tracking unit and the focus unit of the optical pick-up unit 110 in response to the tracking signal and the focus signal. The monitoring unit 130 receives a monitoring signal S_MO from the servo unit 120 and compares the monitoring signal S_MO with a reference signal S_REF (not shown). The monitoring signal S_MO, which is one of the servo signals and the RF signals outputted from the servo unit 120, is monitored so as to detect a shock. The monitoring unit 130 compares the monitoring signal S_MO with the reference signal S_REF to determine whether shock has been applied and generates a blocking signal SBLK if it is determined that shock has been applied. It is preferable that the monitoring unit 130 also determines whether shock has been removed and generates a signal indicating that shock has been removed. It is preferable that the monitoring unit 130 compares the monitoring signal S_MO with the reference signal S_REF to determine whether shock has been removed e.g., a non-shock state. The reference signal S_REF may be changed according to a type of the monitoring signal S_MO.

Figure 3:
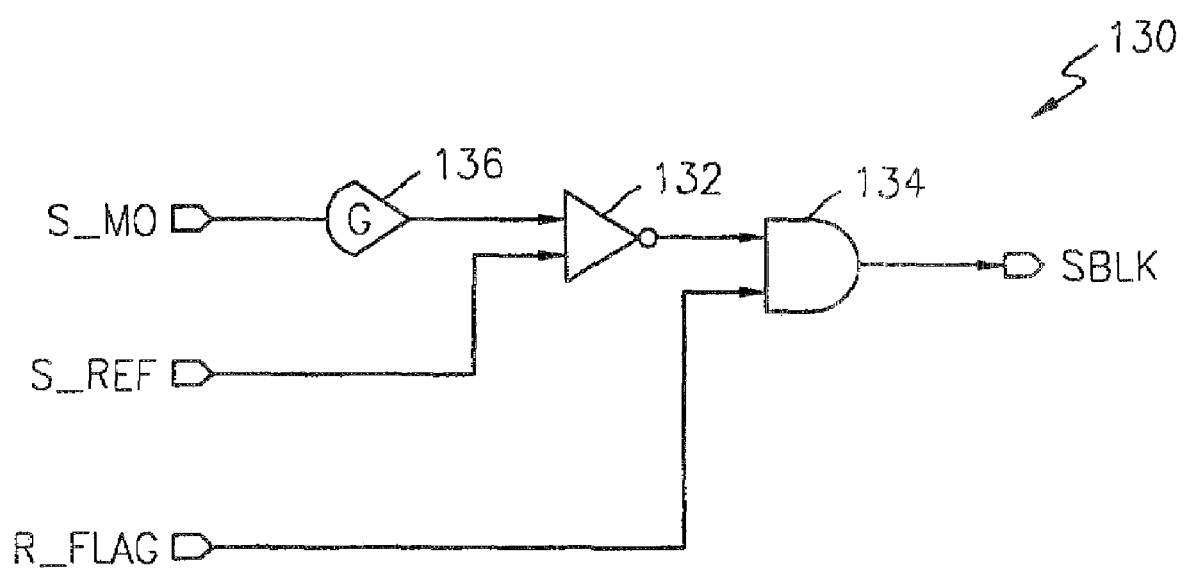
FIG. 3 is a circuit diagram of one embodiment of the monitoring unit of FIG. 2.

One embodiment of the monitoring unit 130 is illustrated in FIG. 3.

Referring to FIG. 3, the monitoring unit 130 includes a comparator 132 and an AND gate 134. The comparator 132 receives the monitoring signal S_MO and the reference signal S_REF to compare the two signals and outputs a comparison signal CS (not shown) of a logic high level '1' or a logic low level '0' according to the comparison result.

It is preferable that the monitoring signal S_MO is one of the focus signals. The focus signals represents all signals that relate to a focus state, such as a focus error signal, a summing signal of the side beam (SBAD), a peak hold signal of a recording and playing radio frequency signal, and a bottom hold signal of a recording and playing radio frequency signal. Here, the SBAD signal indicates a signal of a sum of side beams among the beams reflected from the optical disc. The peak hold signal of recording and playing radio frequency signals indicates a signal having maximum values of the recording and playing radio frequency signals, and the bottom hold signal of recording and playing radio frequency signals indicates a signal having minimum values of the recording and playing radio frequency signals.

Figure 1:
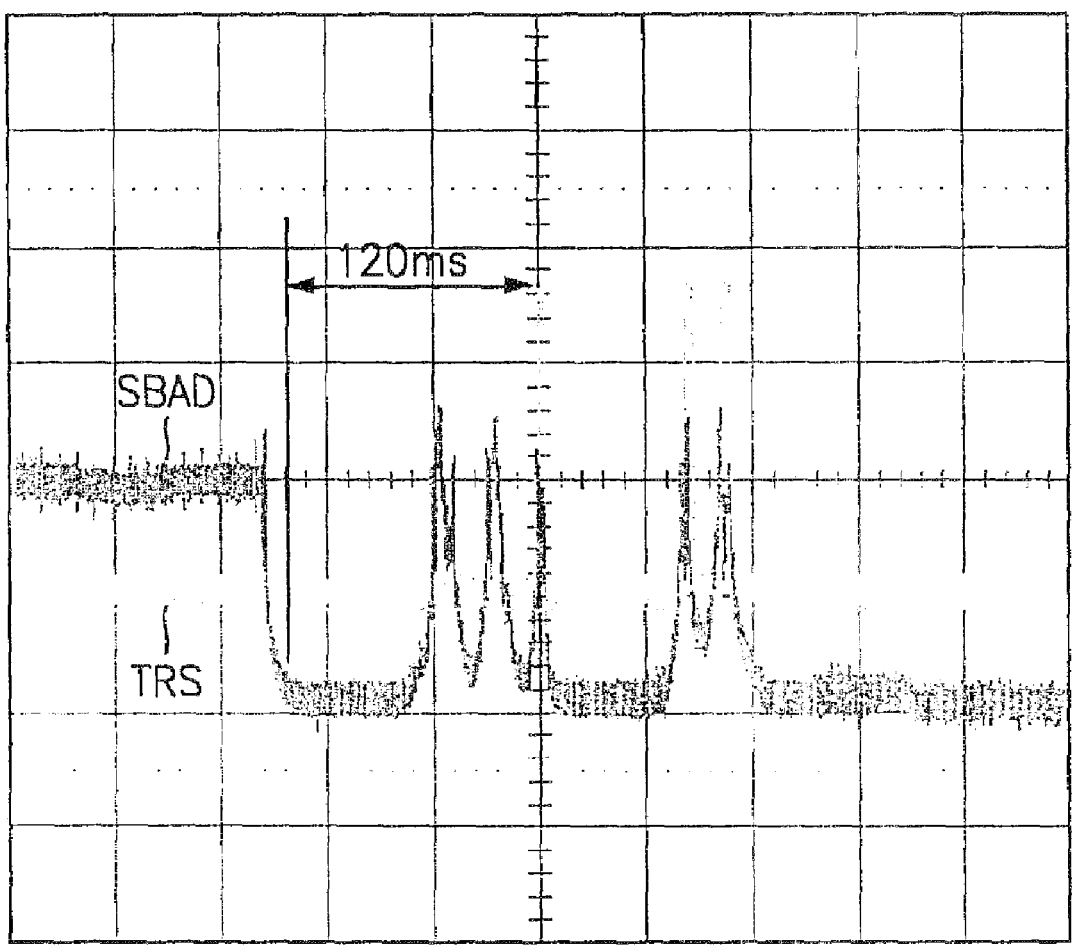
FIG. 1 illustrates a waveform of several signals in an optical disc system.

If required, an amplifier 136 for amplifying the monitoring signal S_MO may be further included. In a case where a level of the monitoring signal S_MO increases when shock is applied, e.g., the monitoring signal S_MO is the TRS of FIG. 1, the comparator 132 generates the comparison signal CS of the logic high level if the monitoring signal S_MO or the amplified monitoring signal S_MOS, is greater than the reference signal S_REF, and otherwise, it generates the comparison signal CS of the logic low level. Whereas, in a case where a level of the monitoring signal S_MO decreases when shock is applied, e.g., the monitoring signal S_MO is the SBAD of FIG. 1, the comparator 132 generates the comparison signal CS of the logic high level if the monitoring signal S_MO or the amplified monitoring signal S_MOS, is less than the reference signal S_REF, and otherwise, it generates the comparison signal CS of the logic low level.

The AND gate 134 performs an AND operation on the comparison signal CS and a recording state flag R_FLAG to generate the blocking signal SBLK. The recording state flag R_FLAG goes to the logic high level while the optical disc system performs recording operations. Therefore, if shock is applied while the optical disc system performs recording operations, the blocking signal SBLK of a predetermined logic level (e.g., a logic high level) is generated. In this embodiment, if shock is applied when the recording state flag R_FLAG is at the logic high level, e.g., the optical disc system is in a recording mode, the blocking signal is generated. However, the blocking signal may be generated both in a recording mode and a playing mode of the optical disc system.

It is preferable that the monitoring unit 130 of FIG. 3 also generates a blocking release signal. In this embodiment, if the comparator 132 compares the monitoring signal S_MO with the reference signal S_REF and determines shock is removed, the comparator 132 generates the comparison signal CS of the logic low level. Accordingly, if shock is removed, the blocking signal SBLK of the logic low level is generated. That is, the blocking signal SBLK of the logic low level, or the blocking signal SBLK which goes to the logic low level from the logic high level, is used for the blocking release signal.

Referring to FIG. 2, the blocking signal SBLK is input to the encoder 140 and the microprocessor 150. The encoder 140 encodes data received from a host 200 and transmits the data to the optical pick-up unit 110. The host 200 may be a computer system.

The encoder 140 stops encoding operations when the blocking signal SBLK is of the high level, so as to stop recording of data onto the optical disc. The encoder 140 resumes encoding operations when the blocking signal SBLK is of the logic low level, so as to resume recording of data onto the optical disc.

The microprocessor 150 outputs an optical power control signal OP_CS for controlling the optical power of a laser diode of the optical pick-up unit 110 in response to the blocking signal SBLK and the blocking release signal. The optical power controlling unit 170 controls the optical power applied by the optical pick-up unit 110, in response to the optical power control signal OP_CS.

Optical power control will be described in more detail below.

The microprocessor 150 generates the optical power control signal OP_CS for turning off the laser diode or changing the level of the optical power of the laser diode so as not to cause damage to the optical disc in response to the blocking signal SBLK. Here, it is preferable that the optical power controlling unit 170 changes the optical power from a recording power mode to a playing power mode so as not to cause damage to the optical disc when shock is applied. The microprocessor 150 generates the optical power control signal OP_CS for changing the optical power of the laser diode from the playing mode to the recording mode, so as to resume recording of data in response to the blocking release signals e.g., the blocking signal of the logic low level.

The microprocessor 150 stores information on the state of the optical disc system such as a position of the optical pick-up unit 110 when recording is stopped, the optical power, and a position where encoding is stopped, in the memory 160 in response to the blocking signal SBLK. The information concerning the state of the optical disc system which is stored in the memory 160, is loaded by the microprocessor 150 in response to the blocking release signal and used to resume the recording or playing operations.

Figure 4:
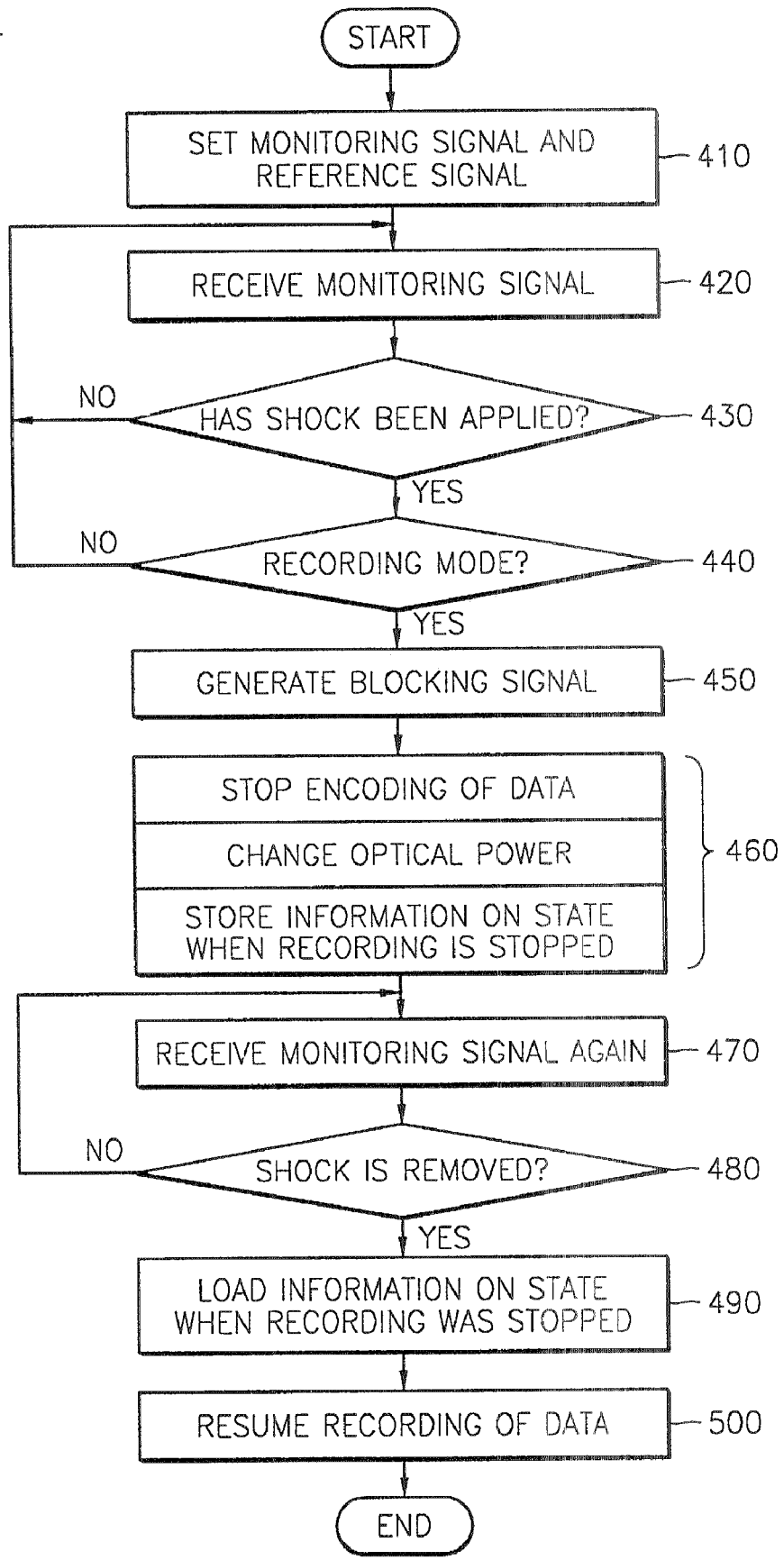
FIG. 4 is a flowchart showing a method of managing shock applied to the optical disc system according to an embodiment of the present invention.

FIG. 4 is a flowchart showing a method of managing shock of the optical disc system according to an embodiment of the present invention. Referring to FIG. 4, a procedure of managing the shock of the optical disc system of FIG. 2 is as follows.

First, the monitoring signal S_MO is determined (step 410). As described above, the monitoring signal S_MO is one or more of the focus signals of the optical pick-up unit 110. After the monitoring signal S_MO is determined, the level of the reference signal S_REF is determined (step 410). It is preferable that the level of the reference signal S_REF is determined by an experiment according to a type of the monitoring signal S_MO.

The monitoring signal S_MO is received from the optical pick-up unit 110 of FIG. 2 (step 420), and by comparing the monitoring signal S_MO with the reference signal S_REF whether shock has been applied is determined (step 430). Here, the comparison is performed by determining whether the monitoring signal is greater than the reference signal. If it is determined that shock is applied, it is determined whether a current mode of the optical disc system is in a recording mode (step 440). Here, it is preferable that the recording mode flag R_FLAG is used to indicate the recording mode.

If the optical disc system is in the recording mode, the blocking signal SBLK is generated (step 450). The blocking signal SBLK is used as a flag for protecting the optical disc and data.

If the blocking signal SBLK is generated, encoding of recording data is stopped, the level of the optical power, which is applied by the optical pick-up unit, is changed, and information on the state of the optical disc system when the recording operations are stopped is stored in the memory (step 460). Here, it is preferable that the level of the optical power is changed from the recording mode power to the playing mode power. In addition, it is preferable that the information on the state of the optical disc system when recording is stopped includes a position of the optical pick-up unit when recording is stopped, the optical power, and a position where encoding is stopped.

Thereafter, the monitoring signal S_MO is received again (step 470). At this time, it is determined by comparing the monitoring signal S_MO with the reference signal S_REF whether shock has been removed (step 480). If it is determined that the shock has been removed, the information on the state of the optical disc system when the recording operations were stopped are loaded from the memory (step 490). Then, recording is resumed by using the loaded information (step 500).

As described above, an optical disc and data is protected by managing shock while recording or playing of data in an optical disc system. In addition, when shock has been removed, stable recording or playing of data of the optical disc system is possible by resuming recording or playing of data by using the information on the state of the optical disc system when the recording operations were stopped.

While this invention has been particularly shown and described with reference to preferred embodiments thereof, it will be understood by those skilled in the art that various changes in form and details may be made therein without departing from the spirit and scope of the invention as defined by the appended claims and equivalents.

What is claimed is:

1. A method of managing shock which is applied to an optical disc system, the method comprising:
(a) setting a monitoring signal and setting a level of a reference signal according to the set monitoring signal;

(b) determining whether shock is applied by comparing the monitoring signal with the level of the reference signal;
(c) generating a blocking signal if it is determined that shock is applied;
(d) stopping recording or playing of data on the optical disc in response to the blocking signal and storing information representing the state of the optical disc system when the recording or playing is stopped,
wherein step (d) comprises turning off a laser diode or changing a level of an optical power of the laser diode to a level lower than a predetermined level.

2. The method of claim 1, wherein the monitoring signal is one of a focus error signal, a summing signal of the side beam (SBAD), a peak hold signal of a recording and playing radio frequency signal, a bottom hold signal of a recording and playing radio frequency signal, a tracking error signal, or a disc information signal.

3. The method of claim 1, wherein the optical disc system is a digital versatile disc for vehicles or a blueray.

4. An optical disc system comprising:
a comparator for comparing a monitoring signal with a reference signal and generating a comparison signal; and
a blocking signal generator for generating a blocking signal when the presence of a shock is determined based on the comparison signal,
wherein the optical disc system stops recording or playing data on an optical disc in response to the blocking signal and stores information on the state of the optical disc system when recording or playing is stopped,
wherein the monitoring signal is one of a focus error signal, a summing signal of the side beam (SBAD), a peak hold signal of a recording and playing radio frequency signal, a bottom hold signal of a recording and playing radio frequency signal, a tracking error signal, or a disc information signal.

5. The optical disc system of claim 4, wherein the optical disc system is a digital versatile disc for vehicles or a blueray.

6. A method of managing shock which is applied to an optical disc system, the method comprising:
(a) setting a monitoring signal and setting a level of a reference signal according to the set monitoring signal;
(b) determining whether shock is applied by comparing the monitoring signal with the level of the reference signal;
(c) generating a blocking signal if it is determined that shock is applied;
(d) stopping recording or playing of data on the optical disc in response to the blocking signal and storing information representing the state of the optical disc system when the recording or playing is stopped;
(e) determining whether shock is removed by comparing the monitoring signal with the level of the reference signal;
(f) loading the stored information on the state of the optical disc system if it is determined that shock is removed; and
(g) resuming recording or playing of data on the optical disc by using the loaded information on the state of the optical disc system,
wherein the monitoring signal is one of a focus error signal, a summing signal of the side beam (SBAD), a peak hold signal of a recording and playing radio frequency signal, a bottom hold signal of a recording and playing radio frequency signal, a tracking error signal, or a disc information signal.

7. The method of claim 6, wherein the optical disc system is a digital versatile disc for vehicles or a blueray.

* * * * *